United States Patent [19]

Majima et al.

[11] Patent Number: 4,664,240
[45] Date of Patent: May 12, 1987

[54] FRICTION CLUTCH OPERATED BY A FLUID PRESSURE

[75] Inventors: Hidekazu Majima, Yawata; Takenori Kamio, Neyagawa, both of Japan

[73] Assignee: Kabushiki Kaisha Daikin Seisakusho, Osaka, Japan

[21] Appl. No.: 779,011

[22] Filed: Sep. 23, 1985

[30] Foreign Application Priority Data

Sep. 28, 1984 [JP] Japan ................................. 59-205237

[51] Int. Cl.$^4$ ........................ F16D 25/08; F16D 25/14
[52] U.S. Cl. ............................... 192/85 CA; 192/85 R
[58] Field of Search .............. 192/85 CA, 85 C, 85 R, 192/88 A, 85 AA

[56] References Cited

U.S. PATENT DOCUMENTS

| | | | |
|---|---|---|---|
| 2,020,640 | 11/1935 | Guenther | 192/88 A |
| 3,048,248 | 8/1962 | Becknell | 192/85 CA |
| 3,065,832 | 11/1962 | Becknell | 192/85 CA |
| 3,157,257 | 11/1964 | Root | 192/85 CA X |
| 4,372,434 | 2/1983 | Aschauer | 192/85 AA |
| 4,396,101 | 8/1983 | Black | 192/85 AA |
| 4,479,570 | 10/1984 | Kamio | 192/85 AA |

Primary Examiner—Rodney H. Bonck
Attorney, Agent, or Firm—Armstrong, Nikaido, Marmelstein & Kubovcik

[57] ABSTRACT

A friction clutch operated by a fluid pressure comprises an axially unmovable input shaft; a flywheel fixed to the input shaft; a clutch disc opposed to a friction surface of the flywheel; an output shaft connected to the clutch disc and disposed coaxially to the input shaft; a pressure plate for pressing a friction facing of the clutch disc onto the flywheel; a forcing mechanism of a fluid pressure type for forcing and moving the pressure plate through a bearing toward the flywheel; a forcing mechanism of a fluid pressure type for forcing the flywheel toward the clutch disc through a bearing; a stationary member to which said both forcing mechanisms are fixed; and a pressure controlling mechanism for changing the pressures for both forcing mechanisms correspondingly to each other.

4 Claims, 1 Drawing Figure

FRICTION CLUTCH OPERATED BY A FLUID PRESSURE

BACKGROUND AND SUMMARY OF THE INVENTION

The present invention relates to a friction clutch for a land vehicle.

Generally, in a friction clutch for a vehicle, a friction facing of a clutch disc is pressed onto a flywheel by a pressure plate which is forced by a spring or springs. However, in this structure, when the facing wears, the spring can not apply a sufficient force to the pressure plate, and thus, durability of the clutch is low.

As a counter measure, the applicant has already proposed, in the U.S. Pat. No. 4,479,570 (Japanese Patent Application Nos. 56-80455 and 56-82227), a pneumatic clutch in which a pressure plate is operated by a pneumatic cylinder. In this structure, the pressure plate can press the facing onto the flywheel by a constant force even when the facing wears. However, since the pneumatic cylinder is constructed to rotate together with a clutch cover, it is necessary to disposed a rotary joint having a complicated structure between a stationary air passage at the outside of the clutch cover and a rotating air passage at the inside of the cover.

Accordingly, it is an object of the invention to provide a friction clutch having high durability and including a joint of a simple structure.

Other object of the invention is to provide a friction clutch overcoming following disadvantages.

That is; either in a clutch of a spring type or a pneumatic type, the large clutch cover, which rotates together with the flywheel and the pressure plate, is required to support a spring or a pneumatic cylinder. Therefore, the whole structures become large.

Further, when the facing is pressed by the pressure plate onto the flywheel, which is provided at an end of an output shaft of an engine, the pressing force is applied through the flywheel to the output shaft, so that the bearing for the output shaft is liable to wear.

According to the invention, a friction clutch operated by a fluid pressure comprises an axially unmovable input shaft; a flywheel fixed to the input shaft; a clutch disc opposed to a friction surface of the flywheel; an output shaft connected to the clutch disc and disposed coaxially to the input shaft; a pressure plate for pressing a friction facing of the clutch disc onto the flywheel; a forcing mechanism of a fluid pressure type for forcing and moving the pressure plate through a bearing toward the flywheel; a forcing mechanism of a fluid pressure type for forcing the flywheel toward the clutch disc through a bearing; stationary members to which the forcing mechanisms are fixed; and a pressure controlling mechanism for changing the pressures for both forcing mechanisms correspondingly to each other.

According to the above structure, the forcing mechanism of the fluid pressure type applies a constant force to the pressure plate, even when the facing wears, so that the pressure plate presses the facing onto the flywheel by a sufficient force.

Further, since the forcing mechanisms are mounted on stationary members, the pressure passages for the forcing mechanisms do not include a part which rotates. Therefore, it is not necessary to provide a rotary joint at the pressure passages.

Moreover, since the forcing mechanisms are disposed on the stationary member, a conventional clutch cover is not necessary. Therefore, the structure can be compact. In other words, since the bearings are associated to the forcing mechanisms, the forcing mechanisms can be mounted on the stationary member, and the conventional clutch cover can be eliminated.

Further, one of the forcing mechanisms forces the pressure plate toward the flywheel, while the other forces the flywheel toward the clutch cover, so that the pressing forces by both forcing mechanisms cancel each other. Therefore, a thrust is not applied through the flywheel to the input shaft, i.e., output shaft of the engine, and thus wear of a bearing mechanism (e.g., side metal) for the input shaft is prevented.

Other and further objects, features and advantages of the invention will appear more fully from the following description of the preferred embodiments of the Invention.

DETAILED DESCRIPTION OF THE PREFERRED EMBODIMENTS

Figure 1:
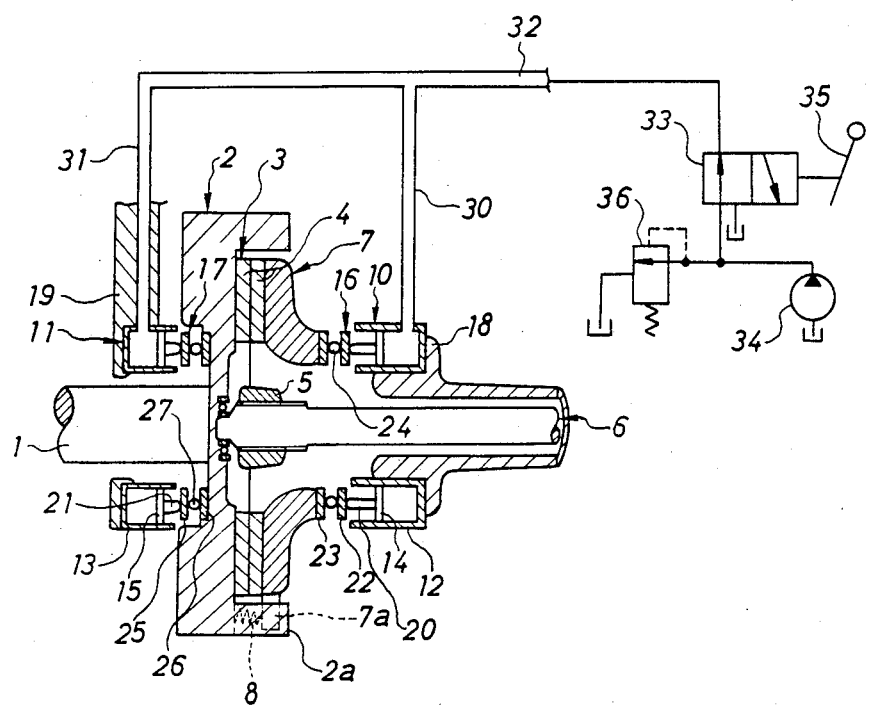
FIG. 1 is a schematic sectional view of an embodiment of the present invention.

Referring to FIG. 1, a flywheel 2 is provided at an end of a input shaft 1 of a clutch, which is constituted by an output shaft of an engine (not shown). An annular friction facing 4 of a clutch disc 3 is opposed to an annular friction surface of the flywheel 2. The clutch disc is provided at its center with a hub 5 which is axially slidably connected to an end of an output shaft 6 of a clutch through a spline. The output shaft 6 constitutes an input shaft of a transmission mechanism (not shown) and is disposed coaxially to the input shaft 1. A pressure plate 7 is disposed at an opposite side to the flywheel 2 with the clutch disc 3 therebetween. Of course, said shafts 1 and 6 are axially unmovable.

The flywheel 2 is provided at its outer peripehral portion with a cylindrical projection 2a which extends to a position radially outside the pressure plate 7. The pressure plate 7 is provided at the outer periphery with circumferentially spaced projections 7a, which project radially outwardly and slidably engage with axial grooves provided in the projection 2a. Therefore, the pressure plate 7 always rotates together with the flywheel 2. Pushing-back mechanisms 8 consisting of springs or the like are arranged in said engaging portions of the projections 2a and 7a. The pushing-back mechanisms 8 force the pressure plate 7 away from the facing 4.

The pressure plate 7 is adapted to be forced by a forcing mechanism 10 toward the clutch disc 3. The flywheel 2 is adapted to be forced by a forcing mechanism 11 toward the clutch disc 3. The forcing mechanism 10 is disposed at a side opposite to the clutch disc 3 with respect the pressure plate 7. The forcing mechanism 11 is disposed at a side opposite to the clutch disc 3 with respect to the flywheel 2. These forcing mechanisms 10 and 11 comprise cylinders 12 and 13, piston 14 and 15 and bearings 16 and 17, respectively, and are constructed as detailed below.

The cylinders 12 and 13 extend annularly around the input and output shafts 1 and 6. However, instead or the annular cylinders, a plurality of (e.g., three of four) small cylinders may be circumferentially spaced around the shafts 1 and 6, respectively. In either case, the cylinders 12 and 13 are stationarily fixed to stationary members 18 and 19, respectively. The stationary member 18 is, e.g., a transmission housing or a clutch housing. The stationary member 19 is, e.g., an outer wall of the engine or the clutch housing.

The piston 14 is fitted into the cylinder 12. A piston rod 20 of the piston 14 is projected from the cylinder 12 toward the pressure plate 7. The piston 15 is fitted into the cylinder 13. A piston rod 21 of the piston 15 is projected from the cylinder 13 toward the flywheel 2.

The bearing 16 is annularly disposed between the end of the piston rod 20 and the radially inner portion of the pressure plate 7. The bearing 16 includes a race 22 contacting the piston rod 20, a race 23 contacting the pressure plate 7 and balls 24 or rollers disposed between the races 22 and 23. The bearing 17 is annularly disposed between the end of the piston rod 21 and the radially inner portion of the flywheel 2. The bearing 17 includes a race 25 contacting the piston rod 21, a race 26 contacting the flywheel 2 and balls 27 or rollers disposed between the races 25 and 26.

Oil passages 30 and 31 are connected to the interiors of the cylinders 12 and 13, respectively. The passages 30 and 31 are divided and extended from a common passage 32, which connects through a selector valve (pressure controlling mechanism) to a hydraulic source 34 such as an oil pump. The selector valve 33 is provided with an operation lever 35, which is operated to selectively supply and release the hydraulic pressure to the passage 32. A regulator valve 36 is arranged between the selector valve 33 and the pressure source 34. Although it is not illustrated, the passage 32 is provided with a modulation device which operates to modulate the hydraulic pressure in accordance with a predetermined characteristic, when the selector valve 33 is switched, so that the clutch may be engaged and disengaged at best conditions without a shock. Since the cylinders 12 and 13 are fixed to the stationary members 18 and 19, as described before, the whole passages 30, 31 and 32 are stationary, and thus, a rotary joint is not arranged in the passages.

The surfaces for receiving the pressures of said pistons 14 and 15 have same areas. Further, as described before, the passages 30 and 31 extend from the common passage 32, and thus, pressures of same value are supplied into the cylinders 12 and 13. Therefore, as will be described later, a force applied by the forcing mechanism 10 through the pressure plate 7 to the flywheel 2 cancels a force applied by the forcing mechanism 11 to the flywheel 2.

There may be a small difference between the areas of the surfaces for receiving the pressures of the pistons 14 and 15. There may be a small difference between the hydraulic pressures supplied into the cylinders 12 and 13. Instead of the hydraulic pressure, a pneumatic pressure may be supplied into the cylinders 12 and 13 from an appropriate means for controlling and supplying the pneumatic pressure.

An operation of the above embodiment is as follows. In a driving condition of the engine, the pressure plate 7 rotates together with the input shaft 1 and the flywheel 2. When the operation lever 35 is switched to the illustrated position to set the selector valve 33 in a connecting or open condition, th hydraulic pressure is upplied from the source 34 through the passages 30, 31 and 32 into the cylinders 12 and 13. Whereby, the piston 14 which receives the pressure in the cylinder 12 forces the pressure plate 7 through the bearing 16, and thus, the pressure plate 7 presses the facing 4 onto the flywheel 2. Thus, the clutch engages, and a torque is transmitted from the flywheel 2 through the clutch disc 3 to the output shaft 6. This pressing force applied by the forcing mechanism 10 to the facing 4 is constant, even when the facing 4 wears. Therefore, intended engaging-disengaging characteristics of the clutch can be maintained even when the facing 4 wears to a large extend, and thus, the clutch can be used without a trouble for a long term.

The piston 15 of the forcing mechanism 11 which receives the pressure in the cylinder 13 forces the flywheel 2 toward the clutch disc 3 through the bearing 17. The force applied by the forcing mechanism 11 to the flywheel 2 is, as described before, same as that applied by the forcing mechanism 10 to the flywheel 2 through the pressure plate 7. Therefore, the pressing forces by both forcing mechanisms 10 and 11 cancel each other, so that an axial force is not applied to the flywheel 2. Accordingly, an axial force is not applied from the flywheel 2 to a side metal and others of a bearing for the input shaft 1, and the side metal and others are prevented from wearing.

When the selector valve 33 is switched to a closed condition to release the pressures in the cylinders 12 and 13, the force which has been applied to the pressure plate 7 by the forcing mechanism 10 is released, and thus, the force to the facing 4 by the pressure plate 7 is released. Whereby, the pushing-back mechanisms 8 pushes back the pressure plate 7 away from the facing 4, so that the facing 4 is separated from the flywheel 2 and the clutch disengages.

According to the invention, as detailed hereinbefore, since the friction facing 4 is adapted to be forced by the pressure of the fluid, the engaging characteristics of the clutch is not affected by the wear of the facing 4. Therefore, the durability of the clutch can be increased.

Since, the forcing mechanisms 10 and 11 are mounted on the stationary members 18 and 19, a rotary joint for the fluid passage can be eliminated, resulting in a simple structure.

Moreover, since it is not necessary to provide a clutch cover for supporting a conventional spring or a cyllinder, the structure can be compact.

Further, the forcing mechanism 11 forces the flywheel 2 when the clutch is engaged, the input shaft 1 is prevented from receiving an axial force from the flywheel 2, so that the side metal and others of the bearing for the input shaft 1 can be prevented from wearing.

Although the invention has been described in its preferred form with a ceratin degree of particularity it is understood that the present disclosure of the preferred form may be changed in the details of construction and the combination, and arrangement of parts may be resorted to without departing from the spirit and scope of the invention as hereinafter claimed.

What is claimed is:

1. A friction clutch operated by a fluid pressure comprising an axially unmovable input shaft; a flywheel fixed to the input shaft; a clutch disc opposed to a friction surface on one side of said flywheel; an output shaft connected to the clutch disc and disposed coaxially to the input shaft; a pressure plate for pressing a friction facing of the clutch disc onto said friction surface on said one side of said flywheel; a first fluid pressure forcing mechanism for forcing and moving said pressure plate through a bearing toward said clutch disc and said flywheel; a second fluid pressure forcing mechanism of a fluid pressure type on the side of said flywheel opposite to said one side for forcing said flywheel toward said clutch disc through a bearing; stationary members to which said first and second fluid pressure forcing mechanisms are fixed; and a pressure controlling mechanism for changing the pressures in said first and second fluid pressure forcing mechanisms correspondingly to each other.

2. A friction clutch of claim 1 wherein said first fluid pressure forcing mechanism for the pressure plate consists of a cylinder mechanism disposed around the output shaft, and includes a piston rod connected to the pressure plate through the bearing.

3. A friction clutch of claim 1 wherein said second fluid pressure forcing mechanism of the flywheel consists of a cylinder mechanism disposed around the input shaft, and includes a piston rod connected to the flywheel through the bearing.

4. A friction clutch of claim 1 wherein said first and second fluid pressure forcing mechanisms are connected to the common pressure controlling mechanism.

* * * * *